United States Patent
Cao et al.

(10) Patent No.: US 11,467,945 B1
(45) Date of Patent: *Oct. 11, 2022

(54) RESILIENCE TESTING ENGINE

(71) Applicant: Snowflake Inc., Bozeman, MT (US)

(72) Inventors: Yuchen Cao, Foster City, CA (US); Stephen Mark Andrew Clark, Menlo Park, CA (US); Prasanna Kumar Krishnamurthy, Sunnyvale, CA (US); Supriya Vasudevan, San Jose, CA (US); Jinzhou Yang, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,884

(22) Filed: Mar. 15, 2022

Related U.S. Application Data

(63) Continuation-in-part of application No. 17/652,902, filed on Feb. 28, 2022.

(51) Int. Cl.
  *G06F 11/00* (2006.01)
  *G06F 11/36* (2006.01)
  *G06F 16/21* (2019.01)

(52) U.S. Cl.
  CPC ...... *G06F 11/3612* (2013.01); *G06F 11/3688* (2013.01); *G06F 16/217* (2019.01)

(58) Field of Classification Search
  CPC ............. G06F 11/3612; G06F 11/3684; G06F 11/3688; G06F 16/217
  See application file for complete search history.

(56) References Cited

U.S. PATENT DOCUMENTS

| | | | |
|---|---|---|---|
| 6,606,395 B1 * | 8/2003 | Rasmussen | B41J 29/393 358/3.1 |
| 11,030,077 B1 * | 6/2021 | Kwan | G06F 11/3692 |
| 2006/0253741 A1 * | 11/2006 | Garakani | G06F 11/3692 714/38.11 |

OTHER PUBLICATIONS

"U.S. Appl. No. 17/652,902, Notice of Allowance dated May 12, 2022", 9 pgs.

* cited by examiner

*Primary Examiner* — Joshua P Lottich
(74) *Attorney, Agent, or Firm* — Schwegman Lundberg & Woessner, P.A.

(57) ABSTRACT

Provided herein are systems and methods for resilience testing. A system includes at least one hardware processor coupled to a memory and configured to decode a workflow to obtain a workload specification and a failure experiment specification. A first set of containers is configured to execute one or more workloads on a testing node. The one or more workloads are defined by the workload specification. A second set of containers is configured to execute one or more failure experiments on the testing node. The one or more failure experiments are based on the failure experiment specification. Execution of the one or more failure experiments triggers an error condition on the testing node. A notification is generated based on at least one metric associated with execution of the one or more workloads and the one or more failure experiments.

30 Claims, 6 Drawing Sheets

RESILIENCE TESTING ENGINE

CROSS-REFERENCE TO RELATED APPLICATIONS

The present application is a continuation-in-part of U.S. Non-Provisional patent application Ser. No. 17/652,902, entitled "RESILIENCE TESTING ENGINE IN A DATABASE SYSTEM," filed on Feb. 28, 2022.

TECHNICAL FIELD

Embodiments of the disclosure relate generally to databases and, more specifically, to resilience testing in a database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

With the rapid growth of application frameworks including cloud-based database technology and other applications technology and products, stability and resiliency become critical factors for each system component in addition to the overall deployment. As application frameworks will occasionally fail or malfunction without warnings, robust and comprehensive resilience plans in each level (e.g., feature, component, layer, and system-level) can be used to ensure such incidents do not cause service disruptions for customers and service providers.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
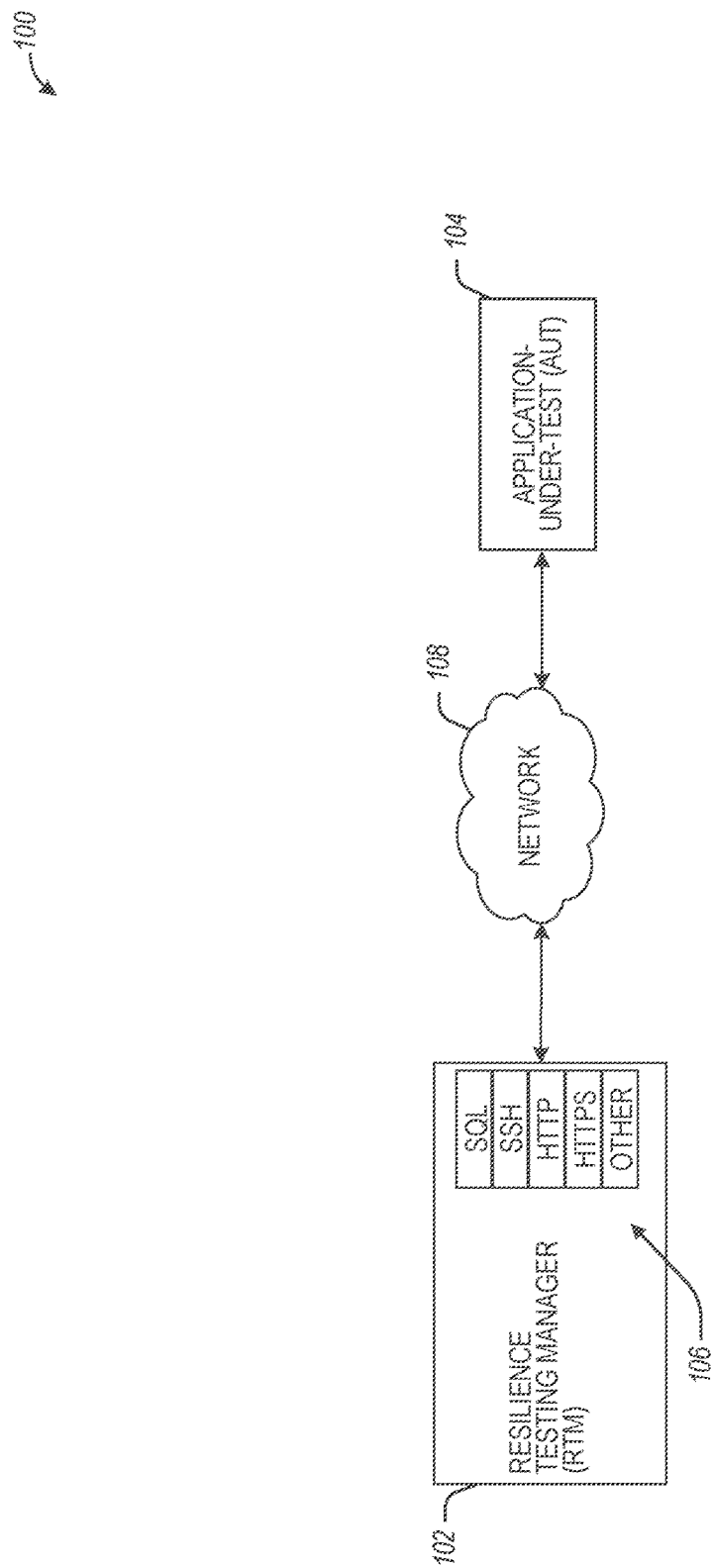
FIG. 1 illustrates an example testing framework that includes an application-under-test (AUT) and a resilience testing manager (RTM), in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As discussed herein, the phrase "container image" refers to a software package (e.g, a static image) that includes configuration information for deploying an application, along with dependencies such as software components, frameworks, or libraries that are required for deploying and executing the application.

As discussed herein, the term "container" refers to an instance of a container image, and an application executes within an execution environment provided by the container. In some aspects, a container is a form of encapsulation to limit a resource and restrict access to a process, which can involve packaging up software code and all its dependencies such that it can run uniformly and consistently on any infrastructure. Further, multiple instances of an application can be deployed from the same container image (e.g., where each application instance executes within its container). Containerization aims to decouple applications and associated structures for running the applications from the infrastructure on which they run. In some embodiments, containers can use persistent storage that is deliverable in a variety of ways, such as but not limited to software-defined in a container orchestrator and external systems.

As discussed herein, the term "persistent storage" refers to a data storage device that retains data after power to that device is shut off. As discussed herein, the term "pod" refers to a set of containers (e.g., executing on a cluster) that accesses shared resources (e.g., network, storage), and one or more pods can be executed by a given computing node. As discussed herein, the terms "cluster" and "container environment" are used interchangeably to indicate a set of compute nodes (e.g., worker machines or worker nodes) that run containerized applications. In some aspects, a cluster has at least one worker node.

The disclosed techniques can be used to configure a resilience testing manager, providing the ability for testing deployments to simulate workloads, failure experiments scenarios in application deployment, as well as to collect metrics and measure the impact of such workloads, failure experiments, and other failure scenarios during data processing. Example failure scenarios include one or more of the following types of failures operating system (OS) level failure (e.g., memory full, disk failure), service level failure (e.g., specific service failures such as warehouse malfunctioning), Cloud environment level failure (e.g., inter-process communications disruption on the same network node, computing process disruption, CPU saturation, etc.).

As used herein, the term "workload" indicates one or more queries (or requests) that can be executed in a container environment. As used herein, the term "failure experiments" (also referred to as "experiments") indicates a set of manipulations that alter one or more hardware or software settings of the testing deployment to trigger at least one network failure. As disclosed herein, workloads and failure experiments are part of a workflow, and a disclosed resilience testing manager is configured to perform resilience testing using such workflow.

In this regard, the resilience testing manager is configured to perform the disclosed techniques associated with long-term and short-term resilience testing plans and to provide platform and chaos environments in connection with data processing in a cloud computing platform. Also, the disclosed techniques can be used to implement and execute resilience testing to gain an understanding of a data processing system/feature's capability to withstand turbulent conditions in cloud computing scenarios. More specifically, the disclosed resilience testing techniques can be used to (a) identify key component scenarios (workloads) and major failure events (experiment) in interest, and build them in reusable components that can be shared within the cloud computing platform: (b) define steady-state of components with concrete measurements and metrics which could also identify abnormal states; and (c) build and implement multiple resilience plans that run testing scenarios within a deployment environment with the simulation of various failures, in a continuous cadence, to monitor a tested component's stability.

The various embodiments that are described herein are described with reference where appropriate to one or more of the various figures. An example testing framework including a resilience testing manager (RTM) configured to perform resilience testing (also referred to as chaos testing) functions and performance testing functions is discussed in connection with FIG. 1. A more detailed description of the RTM of FIG. 1 and the functions it performs is provided in connection with FIGS. 2-5. A more detailed discussion of example computing devices that may be used with the disclosed techniques is provided in connection with FIG. 6.

FIG. 1 illustrates an example testing framework 100 that includes an application-under-test (AUT) 104 and a resilience testing manager (RTM) 102, in accordance with some embodiments of the present disclosure. Referring to FIG. 1, RTM 102 is in communication with AUT 104 via network 108. Network 108 can be an external network, an internal network, or a combination thereof.

RTM 102 in testing framework 100 can be used for developing and running resilience (or "chaos") experiments (also referred to as failure experiments) as well as performance testing against AUT 104. Performance testing can include workload execution, which can be performed at the same time or separately from the failure experiments.

In some aspects, RTM 102 is configured to test any application represented by AUT 104 under unusual or hard-to-predict circumstances. RTM 102 can be configured as a free-standing (or peer) system concerning AUT 104. Additionally, RTM 102 may be running in a different cloud provider region compared to AUT 104, a different cloud provider altogether, or another solution that hosts/runs a service infrastructure.

In some embodiments, RTM 102 uses one or more protocols 106 to talk to, and then disrupt, AUT 104. Protocols 106 can include Structured Query Language (SQL) (e.g., using a Java Database Connectivity (JDBC) API), Secure Shell Protocol (SSH) (e.g., using terminal connections), SSH (Terminal connections), Hypertext Transfer Protocol (HTTP), HTTP Secure (HTTPS), and can be extended to others.

AUT 104 can include arbitrary software executing on a single machine or connected groups of machines and can be deployed within an on-premise lab, room, or datacenter, for example. AUT 104 can include implementation with storage or without storage (e.g., GPU-based compute clusters).

In some embodiments, AUT 104 can include a distributed software system such as a cloud data platform In some aspects, the cloud data platform can include a three-tier database system configured with the following functionalities: data storage, an execution platform, and a compute service manager providing cloud services. The database system can be configured to host and provide data reporting and analysis services to multiple client accounts.

Additional functionalities of RTM 102 are discussed in connection with FIGS. 2-5 hereinbelow.

The disclosed resilience testing techniques enable cloud computing platform feature owners to compose, and run, scalable end-to-end (E2E) workloads against a target environment (such as a test deployment using an execution node) in a declarative manner In some aspects, the components of the overall workload are executed across a distributed set of machines (e.g., a set of containers forming a pod), and allow the overall workload to scale beyond the typical limits of a single software/single test node configuration. In some embodiments, the workloads are composed of smaller, more modular, workloads for re-use.

Advantages of the disclosed resilience testing techniques include the following. (a) ability to orchestrate multiple types of workloads (e.g., background workloads, chaos experiments, measurements, scaled environment workloads, and so forth) all together into one experiment run that can be scheduled and triggered automatically, (b) composability (e.g., declarative re-use/composability of existing workloads into experiment scenarios to perform different experiments targeting different deployments and use-cases): (c) extensibility (e.g., enable network-based database system customers to extend and build their own experiment scenarios and share with others); (d) extendibility (e.g., ability for adding specific extensions/tools and reusing existing tools for specialized load/performance/chaos testing needs), (e) ability to simulate scaled workloads towards scaled, isolated, production-like deployments; and (f) ability to simulate different types of chaos and failures to deployments in a automated, reusable way.

Figure 2:
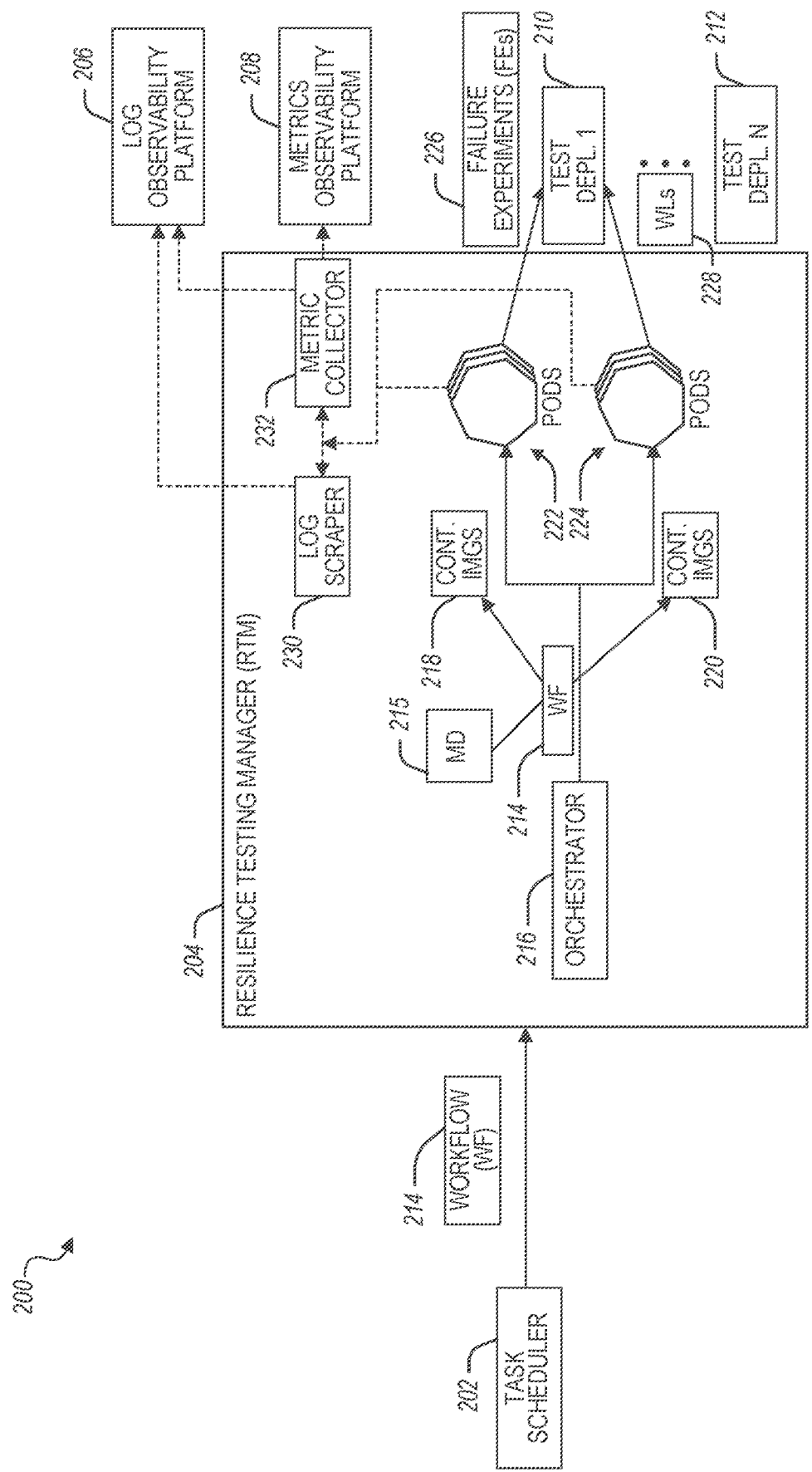
FIG. 2 is a more detailed block diagram of the resilience testing manager of FIG. 1, in accordance with some embodiments of the present disclosure.

FIG. 2 is a more detailed block diagram 200 of the resilience testing manager of FIG. 1, in accordance with some embodiments of the present disclosure. Referring to FIG. 2, RTM 204 (which can be the same as RTM 102 of FIG. 1) may be in communication with a task scheduler 202, a log observability platform 206, metrics observability platform 208, and test deployments 210, . . . , 212. RTM 204 may include an orchestrator 216, a log scraper service 230, and a metric collector service 232.

The task scheduler 202 is configured to generate a workflow 214 which is communicated to orchestrator 216 for processing in connection with resilience testing. Workflow 214 includes at least one workload specification describing at least one workload (e.g., workloads 228) and at least one failure experiment specification describing at least one failure experiment (e.g., failure experiments 226). In some embodiments, workflow 214 container images (e.g., container images 218, . . . , 220) where each container image configures at least one failure experiment or at least one workload. In some embodiments, workflow 214 further includes metadata 215 which can be used as discussed hereinbelow.

In some aspects, task scheduler 202 configures workflow 214 as a Jenkins job (also referred to as a "workflow job" or a "job") which is used as a trigger for initiating a resiliency test using the workflow. For example, when a Jenkins job starts, workflow 214 (e.g., describing workloads and failure experiments of a resiliency test) is communicated to RTM 204 for execution. In other aspects, non-Jenkins build tools may be used for control/secure (present)/audit (log) and oversee the execution of workflow 214.

Orchestrator 216 decodes the received workflow to obtain multiple container images such as container images 218, . . . , 220. The container images are used to obtain metadata 215, a workload specification configuring workloads 228, and a failure experiment specification configuring failure experiments 226. Metadata 215 is received with workflow 214 and is decoded by orchestrator 216. The orchestrator then passes the decoded metadata into different images. In some aspects, orchestrator 216 is configured to translate a descriptive configuration into multiple executable commands (or queries), and sends them to workers (e.g., pods of containers 222 and 224) for execution against a test deployment.

In some embodiments, workloads 228 are sent from test environments for execution against isolated environments (e.g, one of the test deployments 210, . . . , 212) or non-isolated environments. For different workflows, different types of workloads may be used (e.g., read-only workloads, write-only workloads, etc.) or their combinations. Workloads 228 may be executed for a pre-set period and scale.

In some embodiments, RTM 204 may use a declarative workload (DEW) engine (not illustrated in FIG. 2) as a tool for implementing workload configuration (e.g., authoring), as well as a runtime for execution.

In some embodiments, failure experiments 226 are sets of manipulations configured for application to a test deployment. For example, failure experiments 226 can be used for scaling the deployment up or down and for triggering a network failure (e.g., draining memories or interrupting/terminating CPU processes, etc.). Similar to workloads, DEW may be used to configure/author the failure experiments. In some aspects, RTM 204 can use existing experiment implementations used in prior resilience testing.

Failure experiments 226 can be configured to use specialized techniques to generate unplanned behavior in targeted components of a target deployment. In some aspects, failure experiments can include the following injection types for causing the unplanned behavior SQL-based injection and OS-based injection.

In some embodiments, an SQL-based injection can be used for injecting faults into a test deployment. The failure experiment using an SQL-based injection can include control measures in place that allow limiting the impact when used. The SQL-based injection can have access to application contexts that can be used to scope when they fire. Example configurations for this injection include configurations for a pre-existing, secured fault injection framework, pre-existing fault-injection locations, using the framework, where actions can be performed, extensions to inject failures into subsystems, fault-injection locations, a better approximation of failure locations (e.g., manage calls to external dependencies), and fault-injection actions for a fault injection framework (e.g., perform JVM termination).

As these injections are SQL-based, a tool that can execute SQL can be used to trigger them. In some aspects, declarative and scripted options of a workload engine of the RTM 204 can be used as the primary tool to inject SQL-based failures into a test deployment and to perform any necessary validation of the resulting state of the deployment.

In some aspects, the failure experiments 226 can include an operating system (OS)-based injection. For example, certain experiment scenarios are better triggered using OS-level primitives. When these techniques are used, it may be more challenging to limit the impact of the injection as the application context may be missing.

In some aspects, an OS-based injection may be configured with a secured mechanism for use on a given instance, or set of instances within the test deployment to perform one or more of block/disrupt disk input/output (I/O) (e.g., using Linux Kernel framework, Fuse, etc.); block/disrupt network connectivity: and resource overutilization (e.g., CPU, memory, storage). As such injections are OS-based, any script can introduce failure to the OS components. In some aspects, these scripts may be executable from the target instance, and any automated mechanisms for that may need to undergo suitable security scrutiny. In some aspects, each injection script may be configured to automatically reset the environment back to the original state after the injection is complete.

After orchestrator 216 obtains container images 218, . . . , 220, orchestrator 216 determines failure experiments 226 and workloads 228 based on a failure experiment specification and a workload specification corresponding to the container images. Orchestrator 216 configures the first set of containers 222 (which can correspond to a first pod) and a second set of containers 224 (which can correspond to a second pod) to execute against test deployment 210. For example, orchestrator 216 configures failure experiments 226 to execute on the first set of containers 222 while the workloads 228 execute on the second set of containers 224, all using test deployment 210. In some embodiments, pods 222 and 224 use a connector to connect to (e.g., using one or more different protocols such as protocols 106 in FIG. 1) test deployment 210 (e.g., to send a workload or send a command to cause a network failure scenario).

In an example embodiment, each test deployment of the available test deployments 210, . . . , 212 can be configured using at least one computing node.

Failure experiments can have a detrimental behavior on the test deployment upon which they are executed. When failure experiments are executed, they may mutate and/or otherwise damage the environment in which they run. In this regard, test deployments 210, . . . , 212 can be configured as isolated computing environments. For example, access by at least another workflow to compute and storage resources of the testing node of the test deployment can be isolated or controlled to configure the test deployment as an isolated computing environment. In some aspects, configuration changes to the testing node of the test deployment are monitored and reversed after the resilience testing configured by the workflow is completed. In other aspects, test deployments 210, . . . , 212 can be configured as non-isolated computing environments.

In some embodiments, metadata 215 obtained from workflow 214 can include information for configuring execution of the failure experiments 226 and the workloads 228. Example metadata 215 can include a duration value (e.g., for configuring a duration of execution of the failure experiments 226 or workloads 228), a testing node specification (e.g., for selecting one of the test deployments 210, . . . , 212 based on the testing node specification), specific indication on which failure experiments or workloads to execute, specific indication on which test deployment to use for the resilience testing, configurations for the first set of containers 222 and the second set of containers 224, etc. In some embodiments, metadata 215 can be stored in a metadata database used by the RTM 204.

In some embodiments, RTM 204 further uses the log scraper service 230 to collect log data from the first set of containers 222 and the second set of containers 224 and store the log data for further processing in the log observability platform 206 RTM 204 also uses a metric collector service 232 to collect metrics from the first set of containers 222 and the second set of containers 224 (e.g., metrics associated with the execution of the failure experiments 226 and workloads 228), which metrics are stored for further processing in the log observability platform 206 and the metrics observability platform 208.

Figure 3:
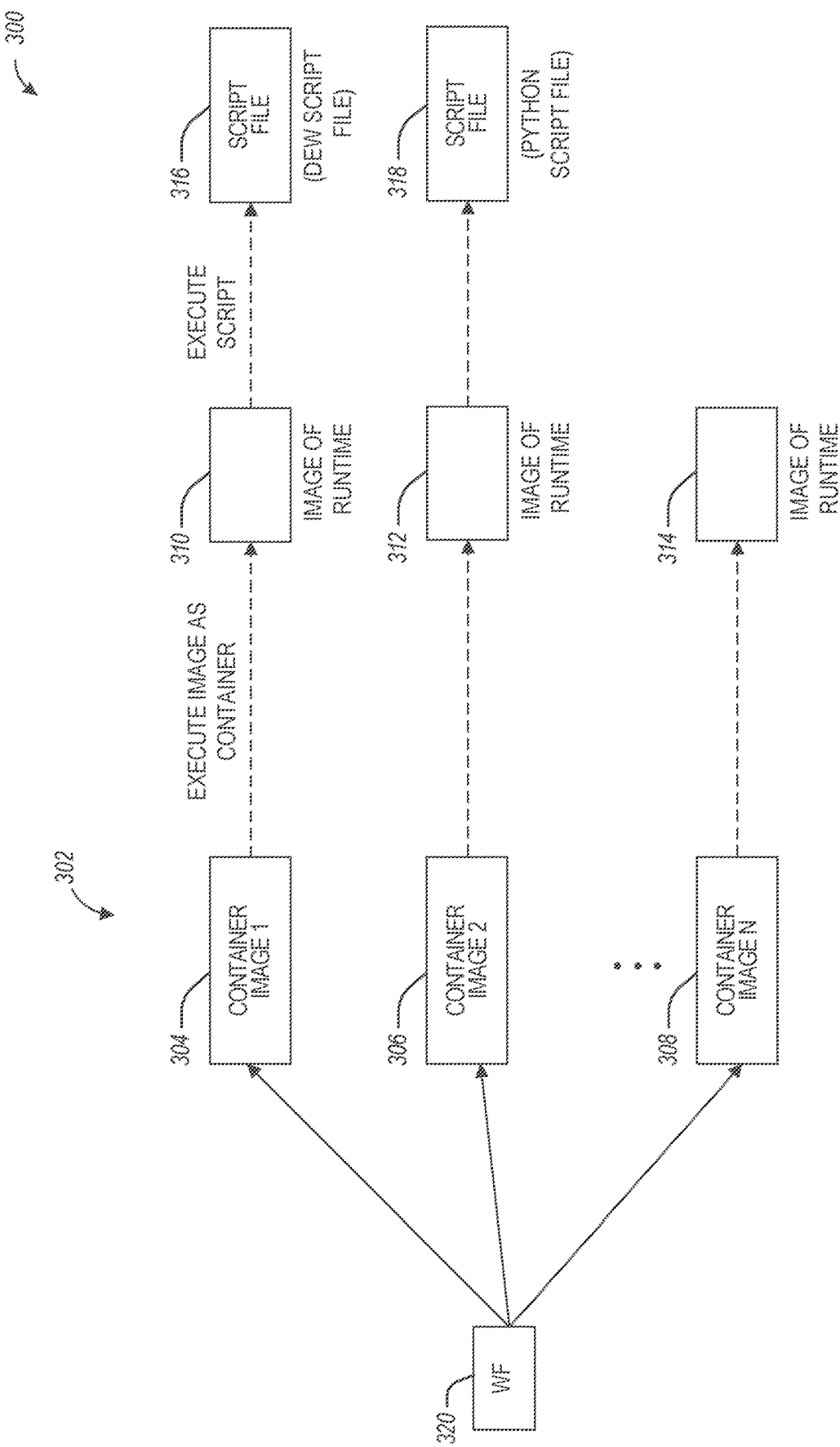
FIG. 3 is a block diagram illustrating an example workflow including multiple container images configured for execution, in accordance with some embodiments of the present disclosure.

FIG. 3 is a block diagram 300 illustrating an example workflow including multiple container images configured for execution, according to some example embodiments. Referring to FIG. 3, workflow 320 can include multiple container images 302, which include container images 304, 306, . . . , 308 configured for execution by the RTM. Each of the multiple container images 302 can configure at least one failure experiment and/or at least one workload. In aspects when a single container image configures more than one task (associated with at least one failure experiment and/or at least one workload), the tasks can be executed in a serial and/or parallel manner.

In some embodiments, container images 304, 306, . . . , 308 can be executed as corresponding containers 310, 312, . . . , 314 in a set of containers (e.g., the first set of containers 222 and the second set of containers 224 in FIG. 2) against a test deployment (e.g., test deployment 210 in FIG. 2).

In some aspects, the container images 304, . . . , 308 are executed as corresponding containers by executing at least one pre-configured script. For example, container images 304 and 306 can be executed as corresponding containers 310 and 312 by executing corresponding scripts 316 (e.g., a DEW script file) and 318 (e.g, a Python script file).

In some embodiments, container images 304, . . . , 308 associated with workflow 320 are executed in parallel, as further illustrated in connection with FIG. 4.

Figure 4:
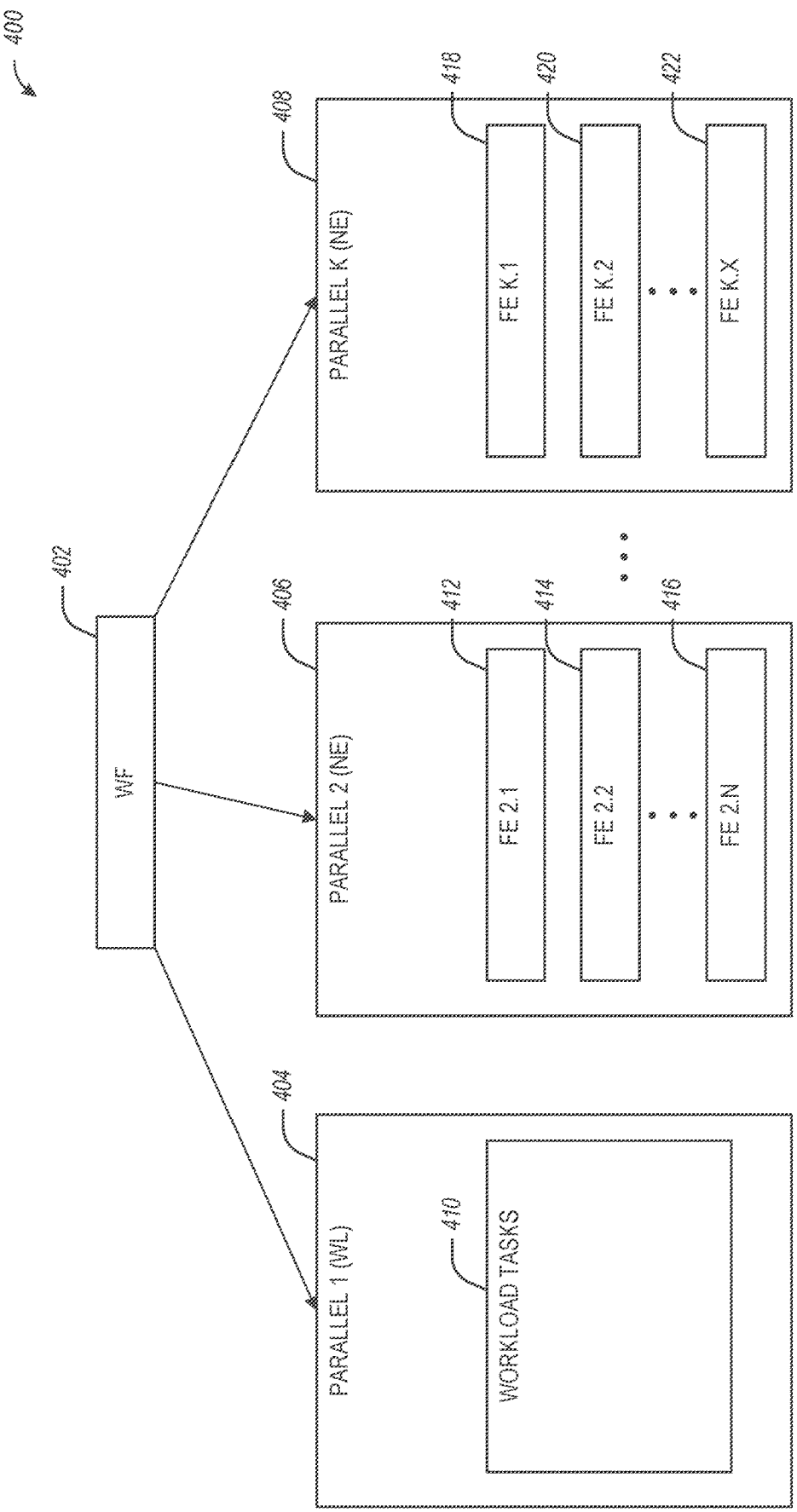
FIG. 4 is a block diagram illustrating the parallel execution of workload tasks and failure experiments in a test deployment, in accordance with some embodiments of the present disclosure.

FIG. 4 is a block diagram 400 illustrating the parallel execution of workload tasks and failure experiments in a test deployment, in accordance with some embodiments of the present disclosure.

Referring to FIG. 4, workflow 402 may be parsed by orchestrator 216 of RTM 204 to determine one or more failure experiments and one or more workloads for execution on a test deployment (e.g., test deployment 210 in FIG. 2) as parallel task sets 404, 406, . . . , 408. Task set 404 can include multiple workload tasks 410, which can be executed in a serial and/or parallel manner within task set 404. Task set 406 can include multiple failure experiments (or FEs) 412, 414, . . . , 416 which can be executed in a serial and/or parallel manner within task set 406. Similarly, task set 408 can include multiple failure experiments 418, 420, . . . , 422 which can be executed in a serial and/or parallel manner within task set 408.

Figure 5:
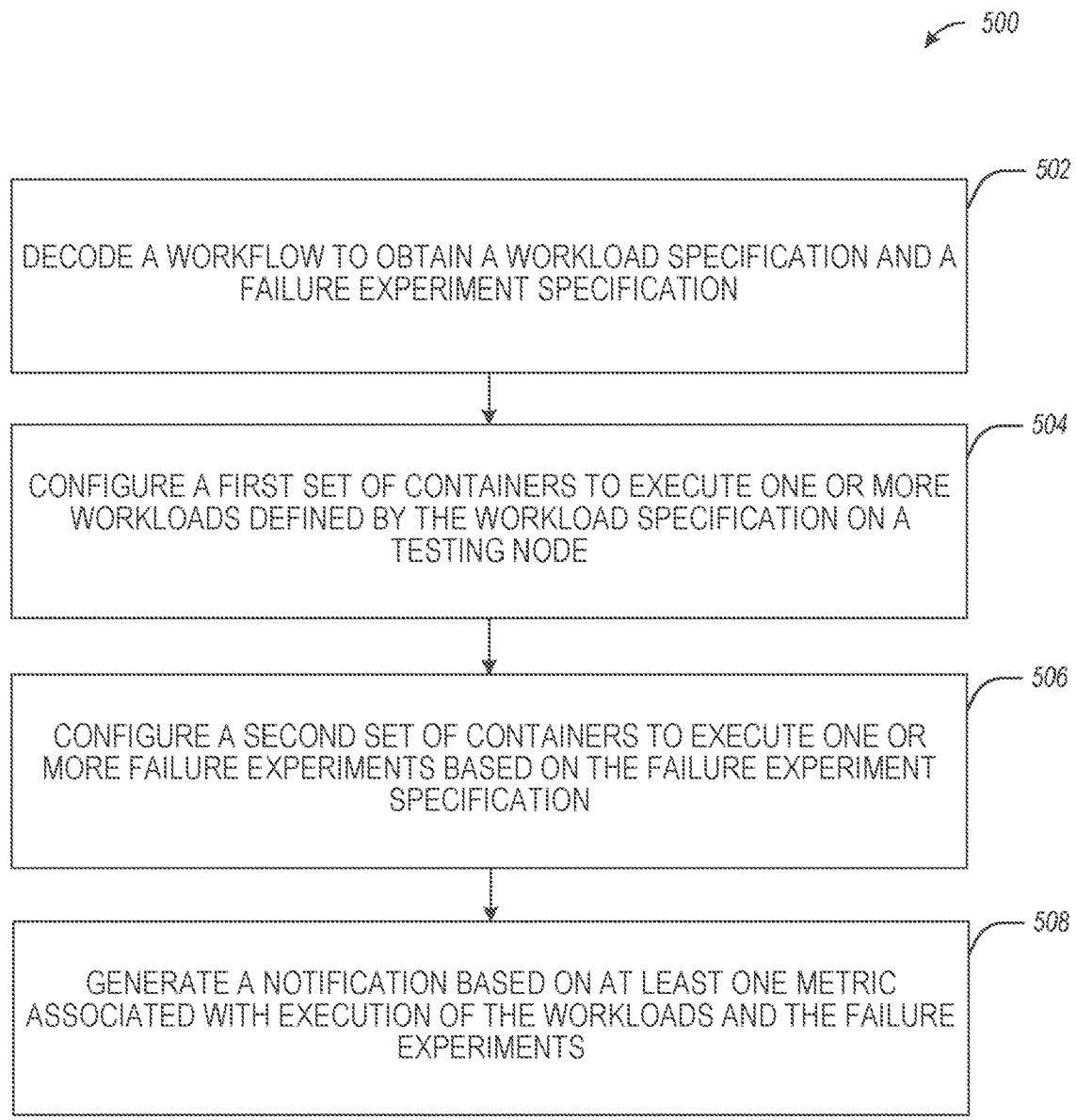
FIG. 5 is a flow diagram illustrating operations in performing a method for resilience testing and a failure experiment, in accordance with some embodiments of the present disclosure.

FIG. 5 is a flow diagram illustrating operations in performing a method 500 for resilience testing including a failure experiment, in accordance with some embodiments of the present. Method 500 may be embodied in computer-readable instructions for execution by one or more hardware components (e.g., one or more processors) such that the operations of the method 500 may be performed by components of the resilience testing manager 102, such as a network node which may be implemented as machine 600 of FIG. 6 performing the disclosed functions. Accordingly, method 500 is described below, by way of example with reference thereto. However, it shall be appreciated that method 500 may be deployed on various other hardware configurations. In some aspects, the failure experiment used in connection with method 500 may or may not involve network components (e.g., one or more testing nodes) of a test deployment in a failure scenario.

At operation 502, a workflow is decoded to obtain a workload specification and a failure experiment specification. For example, orchestrator 216 decodes workflow 214 received from the task scheduler 202 to obtain container images 218, . . . , 220 which can correspond to a workload specification and a failure experiment specification.

At operation 504, a first set of containers is configured to execute one or more workloads on a testing node. For example, orchestrator 216 configures a set of containers 224 to execute workloads 228, where workloads 228 are defined by the workload specification.

At operation 506, a second set of containers is configured to execute one or more failure experiments on a testing node. For example, orchestrator 216 configures a set of containers 222 to execute failure experiments 226, where failure experiments 226 are defined by the failure experiment specification. Execution of the one or more failure experiments triggers an error condition on the testing node of test deployment 210.

At operation 508, a notification is generated based on at least one metric associated with the execution of the one or more workloads and the one or more failure experiments. For example, the metric collector service 232 collects metrics associated with the execution of the workloads 228, and the failure experiments 226 on the sets of containers 222 and 224. Orchestrator 216 or the metrics observability platform 208 can generate a notification based on the collected metrics.

In some embodiments, workflow 214 further includes metadata 215, which specifies a duration value and a testing node specification.

In some aspects, orchestrator 216 is further configured to select the testing node from a plurality of available testing nodes based on the testing node specification.

In an example embodiment, orchestrator 216 further configures a duration for the execution of the one or more failure experiments based on the duration value.

In an example embodiment, access by at least a second workflow to compute and storage resources of the testing node is isolated to configure the testing node as an isolated testing deployment.

In some aspects, configuring the testing node as the isolated testing deployment further includes monitoring changes to the compute and storage resources caused by the error condition, and reversing the changes to the compute and storage resources after the execution of the one or more workloads and the failure experiment.

In some embodiments, the one or more workloads include a plurality of queries, and the one or more failure experiments include a plurality of failure experiments. The orchestrator 216 further configures the first set of containers to execute the plurality of queries in parallel with the execution of the plurality of failure experiments by the second set of containers.

In an example embodiment, orchestrator 216 or the log scraper service 230 further cause generation of at least one log associated with the execution of the one or more workloads and the one or more failure experiments and storing the at least one log and the at least one metric in a shared database.

In some aspects, orchestrator 216 or the metrics observability platform 208 generates the notification when at least one metric exceeds a threshold value.

Figure 6:
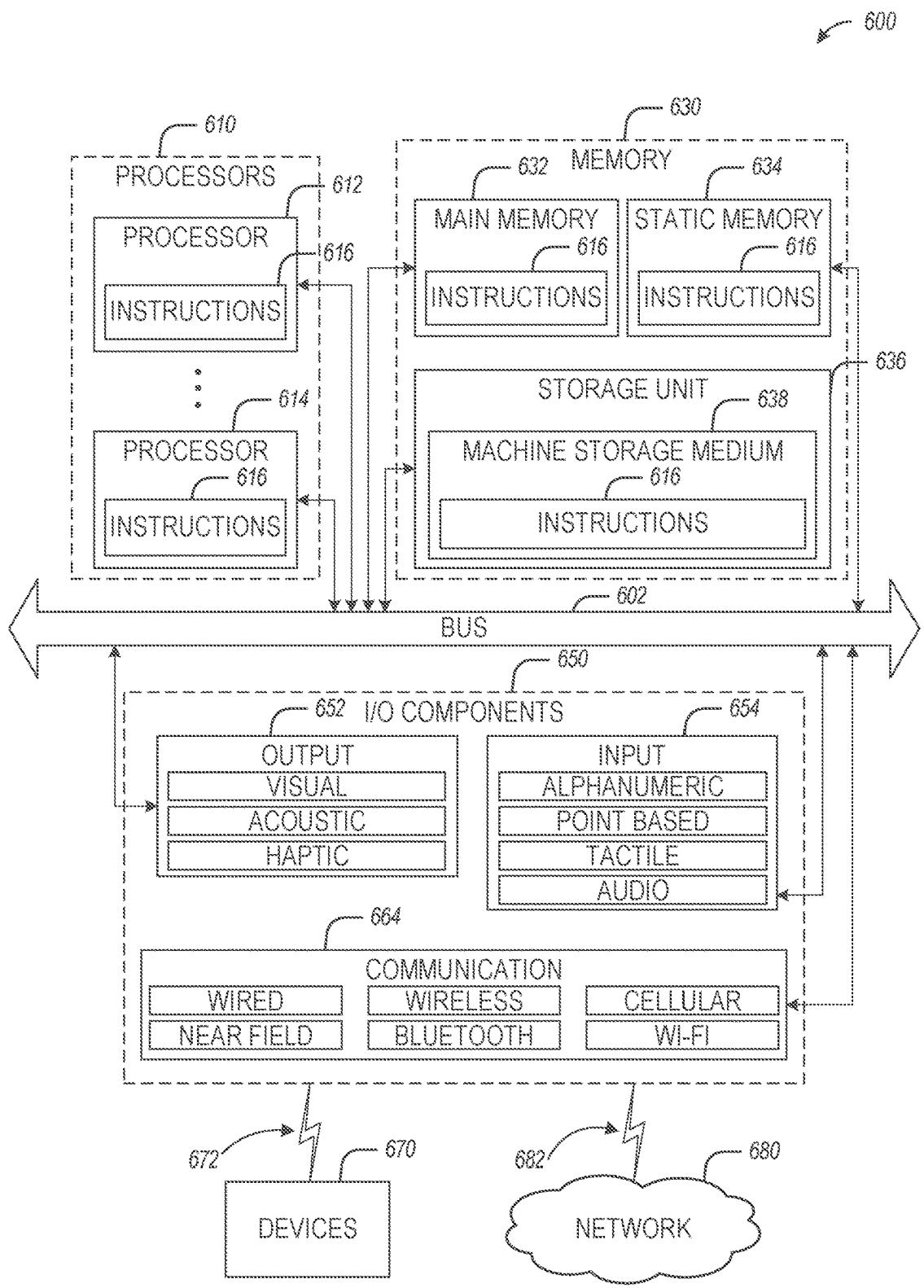
FIG. 6 illustrates a diagrammatic representation of a machine in the form of a computer system within which a set of instructions may be executed for causing the machine to perform any one or more of the methodologies discussed herein, in accordance with some embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, instructions 616 may cause machine 600 to execute any one or more operations of method 500 (or any other technique discussed herein, for example in connection with FIG. 2-FIG. 5). As another example, instructions 616 may cause machine 600 to implement one or more portions of the functionalities discussed herein. In this way, instructions 616 may transform a general, non-programmed machine into a particular machine 600 that is specially configured to carry out any one of the described and illustrated functions in the manner described herein. In yet another embodiment, instructions 616 may configure a computing node to carry out any one of the described and illustrated functions in the manner described herein.

In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

Machine 600 includes processors 610, memory 630, and input/output (I/O) components 650 configured to communicate with each other such as via a bus 602. In some example embodiments, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within machine storage medium 638 of the storage unit 636, within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g, a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components to provide communication via other modalities. The device 670 may be another machine or any of a wide variety of peripheral devices (e.g., a peripheral device coupled via a universal serial bus (USB)).

The various memories (e.g, 630, 632, 634, and/or memory of the processor(s) 610 and/or the storage unit 636) may store one or more sets of instructions 616 and data structures (e.g, software) embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of several well-known transfer protocols (e.g., hypertext transfer protocol (HTTP)). Similarly, instructions 616 may be transmitted or received using a transmission medium via coupling 672 (e.g., a peer-to-peer coupling or another type of wired or wireless network coupling) to the device 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 500 may be performed by one or more processors. The performance of certain of the operations may be distributed among the one or more processors, not only residing within a single machine but also deployed across several machines. In some embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: decoding a workflow to obtain a workload specification and a failure experiment specification; configuring a first set of containers to execute one or more workloads on a testing node, the one or more workloads defined by the workload specification; configuring a second set of containers to execute one or more failure experiments on the testing node, the one or more failure experiments based on the failure experiment specification, and execution of the one or more failure experiments triggering an error condition on the testing node; and generating a notification based on at least one metric associated with execution of the one or more workloads and the one or more failure experiments.

In Example 2, the subject matter of Example 1 includes subject matter where the workflow further comprises metadata, the metadata specifying a duration value and a testing node specification.

In Example 3, the subject matter of Example 2 includes subject matter where the at least one hardware processor further performs operations comprising: selecting the testing node from a plurality of available testing nodes based on the testing node specification.

In Example 4, the subject matter of Examples 2-3 includes subject matter where the at least one hardware processor further performs operations comprising: configuring a duration for execution of the one or more failure experiments based on the duration value.

In Example 5, the subject matter of Examples 1-4 includes subject matter where the at least one hardware processor further performs operations comprising: isolating access by at least a second workflow to compute and storage resources of the testing node, to configure the testing node as an isolated testing deployment.

In Example 6, the subject matter of Example 5 includes subject matter where to configure the testing node as the isolated testing deployment, the at least one hardware processor further performs operations comprising: monitoring changes to the compute and storage resources caused by the error condition; and reversing the changes to the compute and storage resources after the execution of the one or more workloads and the failure experiment.

In Example 7, the subject matter of Examples 1-6 includes subject matter where the one or more workloads comprise a plurality of queries, and the one or more failure experiments comprise a plurality of failure experiments.

In Example 8, the subject matter of Example 7 includes subject matter where the at least one hardware processor further performs operations comprising configuring the first set of containers to execute the plurality of queries in parallel with execution of the plurality of failure experiments by the second set of containers.

In Example 9, the subject matter of Examples 1-8 includes subject matter where the at least one hardware processor further performs operations comprising: generating at least one log associated with the execution of the one or more workloads and the one or more failure experiments; and storing the at least one log and the at least one metric in a shared database.

In Example 10, the subject matter of Examples 1-9 includes subject matter where the at least one hardware processor further performs operations comprising: generating the notification when the at least one metric exceeds a threshold value.

Example 11 is a method comprising: decoding, by at least one hardware processor, a workflow to obtain a workload specification and a failure experiment specification; configuring, by the at least one hardware processor, a first set of containers to execute one or more workloads on a testing node, the one or more workloads defined by the workload specification; configuring, by the at least one hardware processor, a second set of containers to execute one or more failure experiments on the testing node, the one or more failure experiments based on the failure experiment specification, and execution of the one or more failure experiments triggering an error condition on the testing node; and generating, by the at least one hardware processor, a notification based on at least one metric associated with execution of the one or more workloads and the one or more failure experiments.

In Example 12, the subject matter of Example 11 includes subject matter where the workflow further comprises metadata, the metadata specifying a duration value and a testing node specification.

In Example 13, the subject matter of Example 12 includes, selecting the testing node from a plurality of available testing nodes based on the testing node specification.

In Example 14, the subject matter of Examples 12-13 includes, configuring a duration for execution of the one or more failure experiments based on the duration value.

In Example 15, the subject matter of Examples 11-14 includes, isolating access by at least a second workflow to compute and storage resources of the testing node, to configure the testing node as an isolated testing deployment.

In Example 16, the subject matter of Example 15 includes subject matter where configuring the testing node as the isolated testing deployment further comprises monitoring changes to the compute and storage resources caused by the error condition, and reversing the changes to the compute and storage resources after the execution of the one or more workloads and the failure experiment.

In Example 17, the subject matter of Examples 11-16 includes subject matter where the one or more workloads comprise a plurality of queries, and the one or more failure experiments comprise a plurality of failure experiments.

In Example 18, the subject matter of Example 17 includes, configuring the first set of containers to execute the plurality of queries in parallel with execution of the plurality of failure experiments by the second set of containers.

In Example 19, the subject matter of Examples 11-18 includes, generating at least one log associated with the execution of the one or more workloads and the one or more failure experiments; and storing the at least one log and the at least one metric in a shared database.

In Example 20, the subject matter of Examples 11-19 includes, generating the notification when the at least one metric exceeds a threshold value.

Example 21 is a computer-storage medium comprising instructions that, when executed by one or more processors of a machine, configure the machine to perform operations comprising: decoding a workflow to obtain a workload specification and a failure experiment specification; configuring a first set of containers to execute one or more workloads on a testing node, the one or more workloads defined by the workload specification; configuring a second set of containers to execute one or more failure experiments on the testing node, the one or more failure experiments based on the failure experiment specification, and execution of the one or more failure experiments triggering an error condition on the testing node; and generating a notification based on at least one metric associated with execution of the one or more workloads and the one or more failure experiments.

In Example 22, the subject matter of Example 21 includes subject matter where the workflow further comprises metadata, the metadata specifying a duration value and a testing node specification.

In Example 23, the subject matter of Example 22 includes, the operations further comprising: selecting the testing node from a plurality of available testing nodes based on the testing node specification.

In Example 24, the subject matter of Examples 22-23 includes, the operations further comprising: configuring a duration for execution of the one or more failure experiments based on the duration value.

In Example 25, the subject matter of Examples 21-24 includes, the operations further comprising: isolating access by at least a second workflow to compute and storage resources of the testing node, to configure the testing node as an isolated testing deployment.

In Example 26, the subject matter of Example 25 includes subject matter where the operations for configuring the testing node as the isolated testing deployment further comprise: monitoring changes to the compute and storage resources caused by the error condition, and reversing the changes to the compute and storage resources after the execution of the one or more workloads and the failure experiment.

In Example 27, the subject matter of Examples 21-26 includes subject matter where the one or more workloads comprise a plurality of queries, and the one or more failure experiments comprise a plurality of failure experiments.

In Example 28, the subject matter of Example 27 includes, the operations further comprising: configuring the first set of containers to execute the plurality of queries in parallel with execution of the plurality of failure experiments by the second set of containers.

In Example 29, the subject matter of Examples 21-28 includes, the operations further comprising generating at least one log associated with the execution of the one or more workloads and the one or more failure experiments; and storing the at least one log and the at least one metric in a shared database.

In Example 30, the subject matter of Examples 21-29 includes, the operations further comprising: generating the notification when the at least one metric exceeds a threshold value.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
      decoding a workflow to obtain a workload specification and a failure experiment specification;
      configuring a first set of containers to execute one or more workloads on a testing node, the one or more workloads defined by the workload specification;
      configuring a second set of containers to execute one or more failure experiments on the testing node, the one or more failure experiments based on the failure experiment specification, and execution of the one or more failure experiments triggering an error condition on the testing node; and
      generating a notification based on at least one metric associated with execution of the one or more workloads and the one or more failure experiments.

2. The system of claim 1, wherein the workflow further comprises metadata, the metadata specifying a duration value and a testing node specification.

3. The system of claim 2, wherein the at least one hardware processor further performs operations comprising:
   selecting the testing node from a plurality of available testing nodes based on the testing node specification.

4. The system of claim 2, wherein the at least one hardware processor further performs operations comprising:
   configuring a duration for execution of the one or more failure experiments based on the duration value.

5. The system of claim 1, wherein the at least one hardware processor further performs operations comprising:
   isolating access by at least a second workflow to compute and storage resources of the testing node, to configure the testing node as an isolated testing deployment.

6. The system of claim 5, wherein to configure the testing node as the isolated testing deployment, the at least one hardware processor further performs operations comprising:
   monitoring changes to the compute and storage resources caused by the error condition; and
   reversing the changes to the compute and storage resources after the execution of the one or more workloads and the failure experiment.

7. The system of claim 1, wherein the one or more workloads comprise a plurality of queries, and the one or more failure experiments comprise a plurality of failure experiments.

8. The system of claim 7, wherein the at least one hardware processor further performs operations comprising:
   configuring the first set of containers to execute the plurality of queries in parallel with execution of the plurality of failure experiments by the second set of containers.

9. The system of claim 1, wherein the at least one hardware processor further performs operations comprising:
   generating at least one log associated with the execution of the one or more workloads and the one or more failure experiments; and
   storing the at least one log and the at least one metric in a shared database.

10. The system of claim 1, wherein the at least one hardware processor further performs operations comprising:
    generating the notification when the at least one metric exceeds a threshold value.

11. A method comprising:
    decoding, by at least one hardware processor, a workflow to obtain a workload specification and a failure experiment specification;

configuring, by the at least one hardware processor, a first set of containers to execute one or more workloads on a testing node, the one or more workloads defined by the workload specification;

configuring, by the at least one hardware processor, a second set of containers to execute one or more failure experiments on the testing node, the one or more failure experiments based on the failure experiment specification, and execution of the one or more failure experiments triggering an error condition on the testing node; and generating, by the at least one hardware processor, a notification based on at least one metric associated with execution of the one or more workloads and the one or more failure experiments.

12. The method of claim 11, wherein the workflow further comprises metadata, the metadata specifying a duration value and a testing node specification.

13. The method of claim 12, further comprising:
selecting the testing node from a plurality of available testing nodes based on the testing node specification.

14. The method of claim 12, further comprising:
configuring a duration for execution of the one or more failure experiments based on the duration value.

15. The method of claim 11, further comprising:
isolating access by at least a second workflow to compute and storage resources of the testing node, to configure the testing node as an isolated testing deployment.

16. The method of claim 15, wherein configuring the testing node as the isolated testing deployment further comprises:
monitoring changes to the compute and storage resources caused by the error condition; and
reversing the changes to the compute and storage resources after the execution of the one or more workloads and the failure experiment.

17. The method of claim 11, wherein the one or more workloads comprise a plurality of queries, and the one or more failure experiments comprise a plurality of failure experiments.

18. The method of claim 17, further comprising:
configuring the first set of containers to execute the plurality of queries in parallel with execution of the plurality of failure experiments by the second set of containers.

19. The method of claim 11, further comprising:
generating at least one log associated with the execution of the one or more workloads and the one or more failure experiments; and
storing the at least one log and the at least one metric in a shared database.

20. The method of claim 11, further comprising:
generating the notification when the at least one metric exceeds a threshold value.

21. A computer-storage medium comprising instructions that, when executed by one or more processors of a machine, configure the machine to perform operations comprising:
decoding a workflow to obtain a workload specification and a failure experiment specification;

configuring a first set of containers to execute one or more workloads on a testing node, the one or more workloads defined by the workload specification;

configuring a second set of containers to execute one or more failure experiments on the testing node, the one or more failure experiments based on the failure experiment specification, and execution of the one or more failure experiments triggering an error condition on the testing node; and generating a notification based on at least one metric associated with execution of the one or more workloads and the one or more failure experiments.

22. The computer-storage medium of claim 21, wherein the workflow further comprises metadata, the metadata specifying a duration value and a testing node specification.

23. The computer-storage medium of claim 22, the operations further comprising:
selecting the testing node from a plurality of available testing nodes based on the testing node specification.

24. The computer-storage medium of claim 22, the operations further comprising:
configuring a duration for execution of the one or more failure experiments based on the duration value.

25. The computer-storage medium of claim 21, the operations further comprising:
isolating access by at least a second workflow to compute and storage resources of the testing node, to configure the testing node as an isolated testing deployment.

26. The computer-storage medium of claim 25, wherein the operations for configuring the testing node as the isolated testing deployment further comprise:
monitoring changes to the compute and storage resources caused by the error condition; and
reversing the changes to the compute and storage resources after the execution of the one or more workloads and the failure experiment.

27. The computer-storage medium of claim 21, wherein the one or more workloads comprise a plurality of queries, and the one or more failure experiments comprise a plurality of failure experiments.

28. The computer-storage medium of claim 27, the operations further comprising:
configuring the first set of containers to execute the plurality of queries in parallel with execution of the plurality of failure experiments by the second set of containers.

29. The computer-storage medium of claim 21, the operations further comprising:
generating at least one log associated with the execution of the one or more workloads and the one or more failure experiments; and
storing the at least one log and the at least one metric in a shared database.

30. The computer-storage medium of claim 21, the operations further comprising:
generating the notification when the at least one metric exceeds a threshold value.

\* \* \* \* \*